United States Patent [19]
Ruhl et al.

[11] 4,133,389
[45] Jan. 9, 1979

[54] HAND-HELD POWER DRIVEN CULTIVATOR

[75] Inventors: Walter F. Ruhl, Greenville; Robert R. Yeager, Union City, both of Ohio

[73] Assignee: Lambert Corporation, Dayton, Ohio

[21] Appl. No.: 811,196

[22] Filed: Jun. 29, 1977

Related U.S. Application Data

[63] Continuation-in-part of Ser. No. 714,231, Aug. 13, 1976, abandoned.

[51] Int. Cl.² .............................................. A01B 33/06
[52] U.S. Cl. .................................... 172/41; 172/49; 172/112; 172/747
[58] Field of Search ................ 172/41, 42, 43, 49, 172/57, 59, 110, 111, 520, 522, 523, 526, 747, 112; 76/DIG. 7; 56/14.1; 294/55, 55.5

[56] References Cited

U.S. PATENT DOCUMENTS

| | | | |
|---|---|---|---|
| 369,600 | 9/1887 | Hicks | 172/526 X |
| 1,592,825 | 7/1926 | Gardner et al. | 172/42 |
| 2,625,867 | 1/1953 | Hands, Jr. | 172/41 |
| 3,616,862 | 11/1971 | van der Lely | 172/49 X |
| 3,736,989 | 6/1973 | Randol et al. | 172/747 X |
| 3,804,450 | 4/1974 | Guenzel | 294/55 X |
| 4,003,436 | 1/1977 | Foster et al. | 172/41 |

FOREIGN PATENT DOCUMENTS

| | | | |
|---|---|---|---|
| 1800229 | 5/1970 | Fed. Rep. of Germany | 172/41 |
| 530635 | 7/1955 | Italy | 172/59 |
| 379225 | 6/1973 | U.S.S.R. | 172/526 |
| 386596 | 8/1973 | U.S.S.R. | 172/49 |

*Primary Examiner*—Richard T. Stouffer
*Attorney, Agent, or Firm*—Biebel, French & Nauman

[57] ABSTRACT

A hand-held, power driven cultivator includes a housing and cultivator blades which rotate about axes oblique to the vertical axis of the cultivator, the blades extending generally in planes which converge beneath the housing. The cultivator is driven by an electrical motor and has a power train which includes a speed reduction gear arrangement. The cultivator blades may overlap slightly as they rotate and may be formed of hardened metal or plastic. The housing of the cultivator is provided with a skirt which extends outwardly and downwardly about the sides and rear of the housing. The skirt is provided with lower depending side shield portions and a rear rake or spreading portion. The rear rake or spreading portion is formed with notches or teeth to smooth and spread cultivated dirt.

2 Claims, 13 Drawing Figures

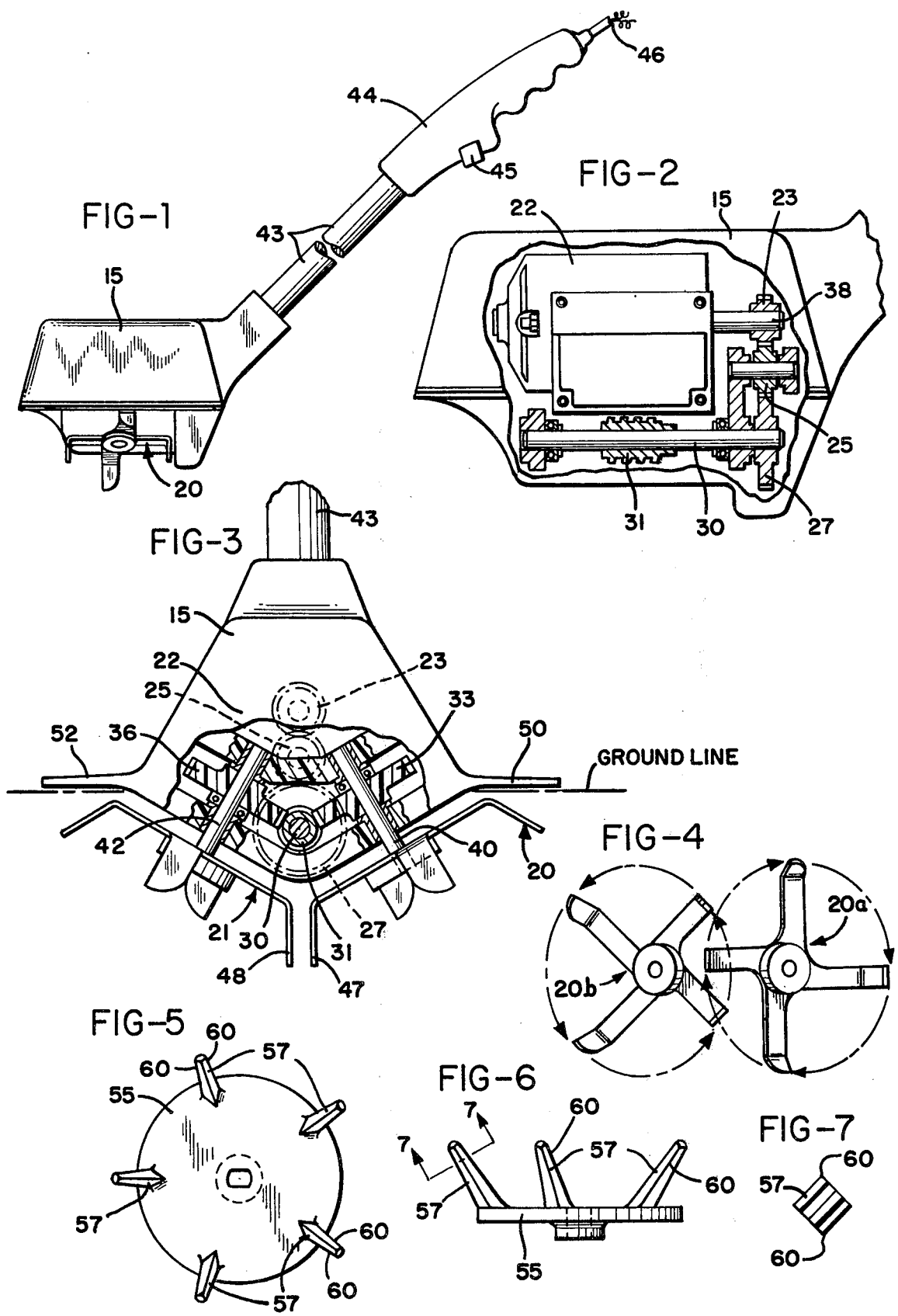

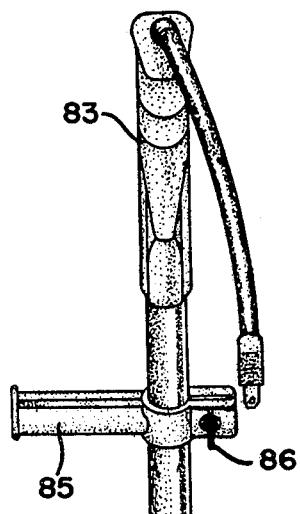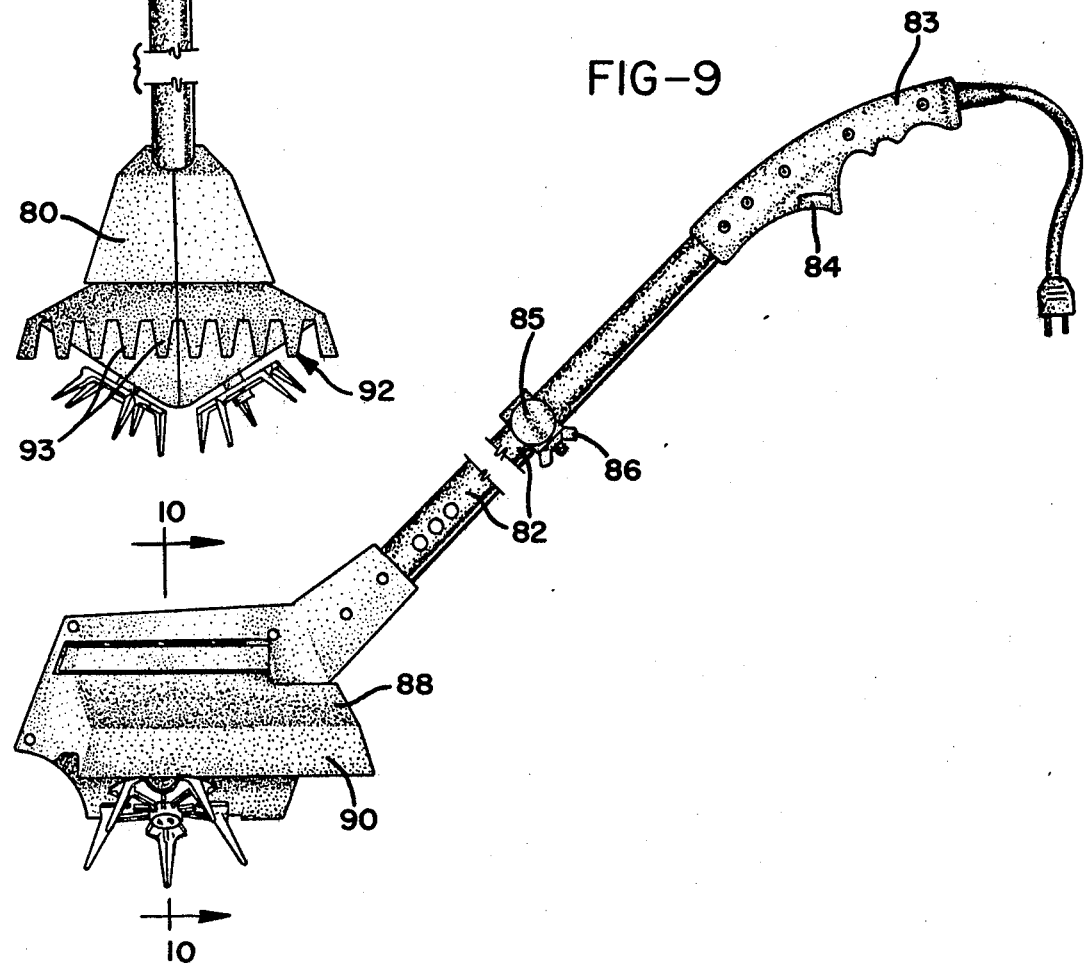

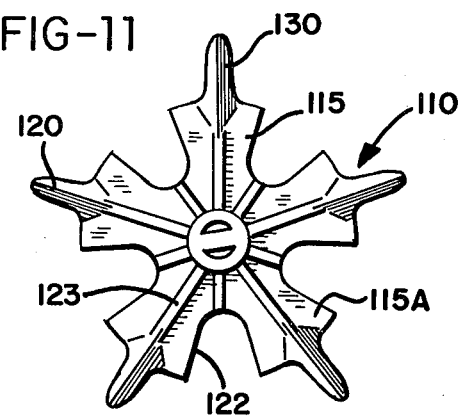
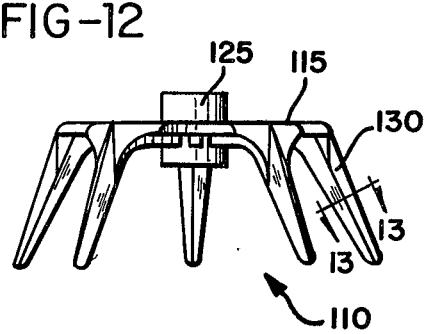
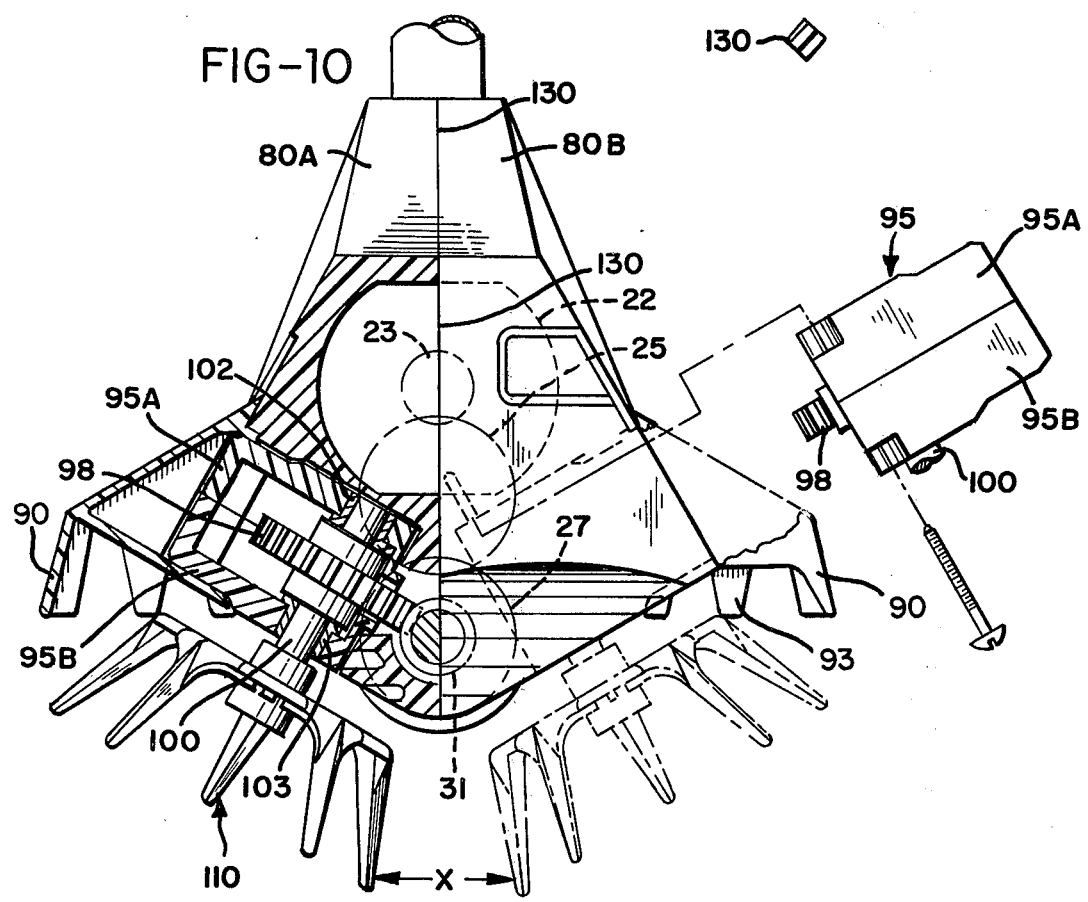

HAND-HELD POWER DRIVEN CULTIVATOR

CROSS REFERENCE TO RELATED APPLICATION

This is a continuation-in-part of application Ser. No. 714,231 filed Aug. 13, 1976, now abandoned.

BACKGROUND OF THE INVENTION

The present invention relates to a cultivator device, and more particularly, to a powered, hand-held cultivator of the type used for cultivation of a small garden or flower beds.

Cultivation of a garden plot is a time-consuming but necessary task to ensure vegetable plants having good yield. Typically, a gardener will use an implement, such as a hoe, to loosen and turn the soil between adjacent rows of plants. This is done for several reasons. Any weeds growing in this area are destroyed. At the same time, earth which has become hard and packed down from watering the plants is loosened. This allows air to penetrate the soil and, additionally, facilitates watering the plants. Since this sort of cultivation can be extremely time consuming and requires substantial physical labor, several power-driven implements have been developed for cultivation.

U.S. Pat. No. 2,888,084 issued May 26, 1959 to Trecker, shows a hand-held cultivator which is powered by a lawn mower. The cultivator includes either one or two cultivator blade units, each unit being rotatable about a vertical axis and including a number of blades. The single blade configuration of the Trecker device would be very difficult to use since rotation of the blade will apply a lateral force to the implement. The dual blade configuration is limited in its depth of cultivation and would not appear to move easily through the soil.

Another type of power-driven cultivator tool has blade units which rotate in a vertical plane about horizontal axes. Cultivators of this sort facilitate movement through the soil because the blades are rotated in the direction of movement and are not completely submerged below ground level. Since the blade units are typically positioned on opposite sides of the cultivator housing, however, this type of cultivator will leave uncultivated a strip of soil directly beneath the housing. It will therefore be necessary to make multiple passes in order to ensure complete cultivation. Additionally, vibration and upward reaction of cultivators of this type may become excessive depending upon soil conditions.

As shown in U.S. Pat. No. 1,021,228 issued Mar. 26, 1912 to Ayers, and in U.S. Pat. No. 368,082 issued Aug. 9, 1887 to Featherstone, cotton choppers suited for above ground operation have used multiple blades rotating on oblique axes. U.S. Pat. No. 2,787,106 issued Feb. 26, 1952 to Brown shows a hand-operated cultivator having octagonal blades which are freely rotatably mounted and positionable in oblique axes. Finally, U.S. Pat. No. 2,363,268 issued Nov. 21, 1944 to Schiel et al, shows a thinning device having a notched cutter disc rotatable about oblique axes. The notches align to permit only evenly spaced plants to continue to grow with the remainder of the plants being cut by the blade edges.

It is seen, therefore, that there is a need for a hand-held power cultivator having stable operating characteristics and operable to cultivate across the entire width of the cultivator.

SUMMARY OF THE INVENTION

A power-driven cultivator has a housing and a plurality of cultivator blade means, rotatably mounted to the exterior of said housing on opposite sides thereof, for cultivating the soil. The blade means extend generally along planes which converge beneath the housing. A power means in the housing is connected to drive the cultivator blade means in counter-rotation fashion. A handle is connected to the housing and includes a grip permitting the cultivator to be held and guided during its operation. The cultivator blade means may be made of steel or, alternatively, of plastic material.

Accordingly, it is an object of the present invention to provide a cultivator device having blades which are rotated about axes inclined to the ground. To provide such a cultivator in which the blades rotate in planes which intersect generally beneath the center of the cultivator; to provide such a cultivator in which the planes of rotation form an angle substantially less than 45° to the ground being cultivated; to provide such a cultivator in which the individual blades may pass alternately across the center line of the cultivator; and to provide such a cultivator in which stable operation is ensured.

These and other objects and advantages of the invention will be apparent from the following description, the accompanying drawings, and the appended claims.

BRIEF DESCRIPTION OF THE DRAWINGS

FIG. 1 is a side view of the cultivator of the present invention;

FIG. 2 is an enlarged view of the cultivator with portions broken away and in section;

FIG. 3 is an enlarged partial view of the cultivator as seen looking left to right in FIG. 1, with portions broken away and in section;

FIG. 4 is a view of an alternative blade arrangement as seen looking up toward the bottom of the cultivator;

FIG. 5 is a bottom view of another alternative blade construction;

FIG. 6 is a side view of the blade arrangement of FIG. 5;

FIG. 7 is a sectional view of a single blade taken generally along the line 7—7 in FIG. 6;

FIG. 8 is a rear elevational view of another embodiment of the invention;

FIG. 9 is a side elevational view of the embodiment of FIG. 8;

FIG. 10 is a partial enlarged section through the housing taken generally along the line 10—10 of FIG. 9;

FIG. 11 is a bottom plan view of the modified soil agitator employed with the embodiment of FIG. 8;

FIG. 12 is a side elevational view of the agitator of FIG. 11; and

FIG. 13 is a sectional view through one of the tines taken generally along the line 13—13 of FIG. 12.

DESCRIPTION OF THE PREFERRED EMBODIMENTS

FIGS. 1, 2 and 3 illustrate one preferred embodiment of the present invention. A housing 15 is provided for mounting a plurality of cultivator blade means 20 and 21 which rotate to cultivate the soil. Blade means 20 and 21 are mounted on the housing exterior and are rotatable about axes which are oblique to the vertical axis of the cultivator and which form an inverted V, as seen in FIG. 3. The blade means thus rotate in planes which intersect generally beneath the center of the housing. The tips of the blades may project out of these planes and include working edges. Since the blade means are not confined to a single blade, it is clear that they will not rotate in a single plane. Each point on the blade means will define a plane during rotation which will converge with a plane defined by a corresponding point on the other blade means.

A power means in housing 15 is provided for driving the cultivator blade means 20 and 21. The power means comprises an electrical motor 22 and a drive train for transferring power from the motor 22 to the cultivator blade means 20 and 21. The drive train includes a spur gear 23, idler gear 25, spur gear 27, worm 31, work shaft 30, and worm gears 33 and 36. Spur gear 23, spur gear 27, and worm gears 33 and 36 may typically be formed from plastic with idler gear 25 formed of powdered metal and worm 31 made of steel.

Motor 22 may typically comprise a ¼ horsepower, universal motor with a no-load speed of 24,000 rpm. Gears 23, 25, and 27 provide a 2-to-1 reduction in rotational speed. There is a further 30-to-1 reduction between worm 31 and worm gears 33 and 36, thus providing an overall 60-to-1 reduction speed between motor shaft 38 and blade shafts 40 and 42. Thus, the theoretical no-load operating speed of the blade means 20 and 21 would be 400 rpm. In operation, of course, the loading on the motor reduces the rotational speed of blade means 20 and 21 to approximately 200 rpm.

The handle 43 includes a grip 44. A trigger switch 45 controls the application of electrical power from the power cord 46 to the electrical motor 22.

The blade configuration shown in FIGS. 1 and 3 is such that blade means 20 and 21 will approach, but will not pass through, a vertical plane extending along the center of the cultivator in the direction of cultivator movement. The minimum distance between blades 47 and 48 may be on the order of ¼ to ½ inch. Because soil has a relatively low column strength, the slight lateral vibration of the cultivator will ensure that even the soil in the gap between blades 47 and 48 will be cultivated. In operation the device may work into the soil approximately to the level shown in FIG. 3. Shields 50 and 52 are provided to prevent stones or other debris from being thrown by the blades.

Because of the oblique rotational planes of the blade means of the device, lateral vibration of the cultivator will be minimized. Further, if the blades should strike a rock or other obstruction, the oblique planes of rotation will minimize the amount of upward thrust exerted on the cultivator. A portion of the thrust will be lateral and this will tend to be opposed by the other blade and soil adjacent the opposite side of the device. It should be noted that the angle formed between the plane of rotation of one of the blade means 20 and 21 and the ground surface is substantially less than 45°. When so configured, the blade sections 47 and 48 extend substantially downward into the soil as they pass adjacent the center of the housing.

FIG. 4 shows an alternative embodiment of blade structure. As indicated by the dashed lines, the somewhat larger diameter blade means 20a and 21a provided in this embodiment have tips which alternately pass through a vertical plane extending along the center of the cultivator in the direction of cultivator movement. The blades, of course, must be synchronized as shown, so that they will intermesh during rotation.

Another alternative blade structure is shown in FIGS. 5, 6 and 7. This cultivator blade mechanism is constructed of plastic material and, may typically be formed by injection molding. A blade disc piece 55 has a plurality of individual blades or times 57 which extend obliquely from the plane of the disc 55. Each blade, as shown in FIG. 7, is square in cross-section. It should be noted that edges 60 extend in the direction of blade movement and provide a type of cutting edge. This blade construction is suitable for cultivating situations in which the soil is looser, and offers less resistance. The blade construction of FIGS. 5-7 provides somewhat more flexible tines and edges which are not so sharp and unyielding.

Another embodiment of the invention is illustrated in FIGS. 8-13. Referring first to FIGS. 8 and 9, a handheld and hand guided cultivator constructed according to this invention is shown as having a housing 80 corresponding in function to the housing 15 previously described. The housing 80 is injection molded of plastic material and is formed in split halves 80a and 80b and suitably joined together. A handle tube 82 is mounted on the rear of the housing and extends at an angle therefrom and terminates in a grip 83 which preferably incorporates an electric trigger switch 84. Spaced a short distance downwardly on the handle tube 82 from the grip 83 is a side grip 85 clamped to the handle tube 82 by a wing nut assembly 86. The side grip 85 may be used to assist in the guided movement of the cultivator.

The housing 80 is provided with a skirt 88 which extends outwardly and downwardly about the sides and the rear of the housing 80. The skirt 88 is thus provided with lower depending side shield portions 90 and a rear rake or spreading portion 92. The portion 92 is formed with notches or teeth 93, as shown, and serves to smooth and spread the cultivated dirt.

The housing 80 supports the electric drive motor 22 therein, the motor and gearing arrangement being identical with that of the embodiment described in connection with FIGS. 1-3. Thus, the motor 22 has mounted on its drive shaft a spur gear 23 shown in outline form, which drives the intermediate idler gear 25 and a driven spur gear 27, all in the manner previously described. The gear 27 is mounted on the worm shaft 30, with a worm gear 31 thereon.

The worm-driven spur gears are again essentially identical to those previously described except that these spur gears are mounted in a capsule or subassembly housing 95. One of the housings 95 is shown in elevation in FIG. 10 as having been withdrawn from the housing 80. The gear housings 95 are split into respective upper and lower sections 95a and 95b and capture therebetween the worm-engaging spur gears 98. The gears 98 correspond to the gears 33 and 36 previously described. For this purpose, the worm-driven spur gears 98 may be formed of a plastic material for engagement with the steel worm 31, and are mounted on steel shafts 100. The upper end of each shaft 100 is received within an upper collar bushing 102, which has its collar received on the inside surface of the housing portion 95a to form a thrust bearing with the adjacent surface of the gear 98. Similarly, a lower collar bushing 103, which may be identical to the bushing 102, is received within the lower bushing portion 95b, again with the collar being positioned adjacent the inside surface and adjacent the gear 98 to form a second thrust surface.

The shaft 100 extends through the bushing 103 to the exterior of the housing for supporting and retaining a soil agitator thereon indicated generally at 110. As in the above embodiments, a pair of identical soil agitators 110 are thus employed, mounted on a pair of output shafts 100 which are positioned in angled relation to each other and to a vertical plane extending therebetween. The shafts 100 are preferably inclined outwardly at an angle of about 30° to such vertical plane and about 60° to each other. The worm 31 and the gears 98 thus define worm gear drive means which interconnect the shafts to the reduction gearing 23, 25 and 27, providing for counter-rotational movement of the outwardly angled shafts to each other.

The soil agitators 110 are tined ground tillers and one of these tillers is carried on the lower ends of each of the shafts 100. The construction of the tillers of this embodiment, as seen in FIGS. 11 and 12, include a generally radially extending support portion 115 terminating in a plurality of peripherally arranged, outwardly angled tines 120. The tines 120 are proportioned to engage the earth underlying the tiller. The agitators 110 are preferably molded of a high strength plastic material such as a nylon. Preferably, the arcuate spaces between the adjacent tines is removed as indicated at 122, thus defining individual generally radially extending legs 115a formed as an integral part of the supporting portion 115. The legs 115a are reinforced by radially extending ribs 123 on the lower surfaces thereof. The center of the support portion 115 defines a hub 125 which is proportioned to be engaged over a flattened end of the shaft 100.

The individual tines 120 are somewhat tapered so that they are broader at their tops than at their bottoms, and are preferably square in cross-section throughout their length and oriented so that an edge 130 is presented to the soil, in the direction of rotation, in the manner described in connection with the embodiments shown in FIGS. 5-7. In addition, the tines extend outwardly and downwardly at an angle of about 60° to the plane of the support portion 115 and about 30° to their axes of rotation. The tines pass adjacent a vertical plane therebetween, as represented by the parting line 130 in FIG. 10.

At their closest points, the adjacent tines 120 are substantially vertical to the ground and parallel to each other, and are spaced from each other a distance "X" as shown in FIG. 10. The distance "X" is less than the arcuate spacing between the adjacent tines on one of the agitators and is also less than the radius of the tines 130 from the shaft 100. A narrow column or band of earth is not directly intercepted by the cultivators, but this narrow column of earth is not self-supporting and is therefore effectively cultivated.

The soil agitators 110 thus provide for soil agitation in non-parallel planes and create a stirring or mixing of the underlying soil. The primary cutting and mixing work is achieved by the downwardly angled tines 120 which present their sloping edges 130 to the soil.

In use, a cultivator is placed in a garden in which the soil is to be cultivated. When the switch 84 is activated, the motor turns the individual agitators in counter-rotation fashion so that at their closest point defined by the dimension "X" in FIG. 10, the agitators are turning in such a direction as to tend to propel the unit forwardly along the ground. The fact that the shafts 100 are set at only a small angle to the ground, and the agitators themselves are thus inclined at a correspondingly small angle to the ground, reduces the tendency for the cultivator to run on top of the ground along the surface at high speed, as is common with cultivators as described under the "background" section of this application. Additionally, once the agitators begin to work the ground underlying the cultivator, the cultivator remains easy to handle and control since the tines 120 extend into the ground and the force tending to pull the cultivator forwardly is substantially counteracted by a reverse thrust which is imparted by the tines at the outer portion of their orbits. Thus, for all practical purposes, when the cultivator is being used, the unit is in substantial equilibrium, and the entire cultivator remains relatively stable on the ground and is easy to control. Each agitator is in itself substantially balanced when the earth beneath the cultivator is being worked, so that it is not necessary to hold the cultivator perfectly level with respect to the ground in order to obtain this counter-balancing and easy-to-control condition. The shields 90 define a nominal distance to which the cultivator works and prevents stones or other debris from being propelled outwardly. The teeth 93 act as a rake and tend to redistribute and spread the soil at the rear of the cultivator.

The cultivating action is particularly effective and is controlled by allowing the unit to move forward, or even moving the same backwards or sideways. The shield portions 90 tend to confine the dirt and prevent the same and entrained rocks and the like from being propelled outwardly while the rear shield portion 90 tends to redistribute the cultivated earth.

While the forms of apparatus herein described constitute preferred embodiments of this invention, it is to be understood that the invention is not limited to these precise forms of apparatus, and that changes may be made therein without departing from the scope of the invention.

What is claimed is:

1. A hand-held power cultivator comprising a handle, a housing carried on an end of said handle, an electric drive motor in said housing, reduction gearing in said housing connected to said drive motor, means in the bottom of said housing rotatably supporting a pair of output shafts in underlying relation to said motor and in angled relation to each other and to a vertical plane extending therebetween, said shafts being inclined outwardly at an angle substantially greater than 0° but less than 45° to said vertical plane and being laterally spaced from each other, gear drive means in said housing interconnecting said shafts to said reduction gearing providing for counter-rotational movement of said shafts relative to each other, and a separate tined ground tiller carried on each of said shafts at the lower ends thereof, each of said ground tillers having a tine support portion peripherally terminated in a single annular row of generally downwardly extending tines, which tines are outwardly angled with respect to the axis of the respective said shafts and proportioned to engage the earth underlying said housing and which move when rotated by said shafts in non-intersecting inclined paths, the angle of said tines to the respective said shafts being approximately the same as the said angle of said shafts to said vertical plane so that adjacent said tines at their closest proximity in said paths extend generally parallel to each other and to said vertical plane.

2. A hand-held power cultivator comprising a handle, a housing carried on an end of said handle, an electric drive motor in said housing, reduction gearing in said housing connected to said drive motor, means in the bottom of said housing rotatably supporting a pair of output shafts in underlying relation to said motor and in angled relation to each other and to a vertical plane extending therebetween, said shafts being inclined outwardly at an angle substantially greater than 0° but less than 45° to said vertical plane and being laterally spaced from each other, gear drive means in said housing interconnecting said shafts to said reduction gearing providing for counter-rotational movement of said shafts relative to each other, and a separate tined ground tiller carried on each of said shafts at the lower ends thereof, each of said ground tillers having a tine support portion peripherally terminated in a plurality of generally downwardly extending tines which tines are outwardly angled with respect to the axis of the respective said shafts and proportioned to engage the earth underlying said housing and which move when rotated by said shafts in non-intersecting inclined paths, the angle of said tines to the respective said shafts being approximately the same as the said angle of said shafts to said vertical plane so that adjacent said tines at their closest proximity in said paths extend generally parallel to each other and to said vertical plane, means on said housing defining a skirt having a lower edge positioned above said tillers and controlling the depth of working of the soil by said tillers so that said tines engage the tilled earth substantially throughout their orbits around their respective said paths, said skirt also providing a shield to prevent stones and other debris from being propelled outwardly by the action of said tillers.

* * * * *